United States Patent
Park et al.

(10) Patent No.: US 8,094,048 B2
(45) Date of Patent: Jan. 10, 2012

(54) METHOD OF DECODING SYNTAX ELEMENT IN CONTEXT-BASED ADAPTIVE BINARY ARITHMETIC CODING DECODER AND DECODING DEVICE THEREFOR

(75) Inventors: In-cheol Park, Daejeon (KR); Yong-seok Yi, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1326 days.

(21) Appl. No.: 11/589,819

(22) Filed: Oct. 31, 2006

(65) Prior Publication Data

US 2007/0097850 A1    May 3, 2007

(30) Foreign Application Priority Data

Oct. 31, 2005    (KR) .................. 10-2005-0103425

(51) Int. Cl.
   *H03M 7/00*    (2006.01)
(52) U.S. Cl. ...................................... 341/107
(58) Field of Classification Search ............ 341/107
   See application file for complete search history.

(56) References Cited

U.S. PATENT DOCUMENTS

| | | | | |
|---|---|---|---|---|
| 5,414,423 | A  * | 5/1995 | Pennebaker ............. | 341/107 |
| 6,894,628 | B2 * | 5/2005 | Marpe et al. ............ | 341/107 |
| 7,262,722 | B1 * | 8/2007 | Jahanghir et al. ........ | 341/107 |
| 7,286,710 | B2 * | 10/2007 | Marpe et al. ........... | 382/239 |
| 7,304,590 | B2 * | 12/2007 | Park .................... | 341/107 |
| 7,336,711 | B2 * | 2/2008 | Kobayashi et al. ..... | 375/240.23 |
| 7,365,659 | B1 * | 4/2008 | Hoffmann et al. ...... | 341/107 |
| 7,365,660 | B2 * | 4/2008 | Park et al. ........... | 341/107 |
| 7,379,608 | B2 * | 5/2008 | Marpe et al. .......... | 382/247 |
| 7,599,435 | B2 * | 10/2009 | Marpe et al. ......... | 375/240.16 |
| 7,626,518 | B2 * | 12/2009 | Hussain et al. ........ | 341/51 |
| 7,626,521 | B2 * | 12/2009 | Hussain et al. ........ | 341/67 |
| 7,630,440 | B2 * | 12/2009 | Prakasam ............ | 375/240.25 |
| 7,804,903 | B2 * | 9/2010 | Haque et al. ......... | 375/240.25 |
| 2004/0240559 | A1 | 12/2004 | Prakasam et al. | |
| 2005/0001745 | A1 | 1/2005 | Sankaram | |
| 2005/0179572 | A1 * | 8/2005 | Winger ............... | 341/107 |

FOREIGN PATENT DOCUMENTS

| | | |
|---|---|---|
| JP | 2004-135251 A | 4/2004 |
| KR | 10-2004-0106392 A | 12/2004 |

* cited by examiner

*Primary Examiner* — Eric Yen
(74) *Attorney, Agent, or Firm* — Sughrue Mion, PLLC

(57) ABSTRACT

A method and device for decoding a syntax element are provided. The method includes reading candidate context models which correspond to a syntax element to be decoded; determining a context index increment for the syntax element; selecting a candidate context model of the candidate context models according to the context index increment; and performing binary arithmetic decoding for the syntax element based on the selected candidate context model. The device includes a context model reservoir which reads and stores candidate context models corresponding to a syntax element to be decoded; an increment determining unit which determines a context index increment for the syntax element; a context model selection unit which selects a candidate context model of the candidate context models by using the context index increment; and a decoding unit which performs a binary arithmetic decoding operation for the syntax element based on the selected candidate context model.

18 Claims, 7 Drawing Sheets

FIG. 9

| TEST SEQUENCE | | | SEQUENTIALLY (CYCLES) | IN PARALLEL (CYCLES) | IMPROVEMENT (%) |
|---|---|---|---|---|---|
| NAME | NUMBER OF FRAMES | FRAME SIZE | | | |
| SALESMAN | 81 | 176x144 | 4,400,250 | 3,626,354 | 17.6 |
| FOREMAN | 199 | 176x144 | 7,026,135 | 5,896,614 | 16.1 |
| SILENT | 59 | 176x144 | 3,114,505 | 2,570,510 | 17.4 |
| | | | | AVERAGE | 17.0 |

METHOD OF DECODING SYNTAX ELEMENT IN CONTEXT-BASED ADAPTIVE BINARY ARITHMETIC CODING DECODER AND DECODING DEVICE THEREFOR

CROSS-REFERENCE TO RELATED APPLICATION

This application claims priority from Korean Patent Application No. 10-2005-0103425, filed on Oct. 31, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to Context-based Adaptive Binary Arithmetic Coding (CABAC) decoding, and more particularly, to a context selection and a context model loading through parallel processing in CABAC decoding.

2. Description of the Related Art

CABAC is an entropy coding method used in a main profile of the H.264/AVC standard. In CABAC, each symbol is dynamically coded using statistical features to update its relative probability, thereby improving compression efficiency.

CABAC decoding is the process of sequentially decoding a plurality of binary values (0 or 1), or "bins" from a syntax element which is encoded by a CABAC encoder. To decode each bin, several unit operations are required, including a context selection operation, a context model loading operation, a binary arithmetic decoding operation, a binarization matching operation, and a context model update operation. The unit operations may each require one cycle. Thus, when one bin is decoded without using parallel processing, several cycles are required. For this reason, real time decoding is impossible in practice when a display device has a standard definition (SD) grade or larger screen size. Therefore, the unit operations have to be performed through parallel processing to reduce the decoding time.

SUMMARY OF THE INVENTION

The present invention provides a method of decoding a syntax element in a CABAC decoder, which can reduce decoding time by performing a context selection operation and a context model loading operation through parallel processing.

The present invention also provides a decoding device for performing the above method.

The present invention also provides a computer-readable medium having embodied thereon a computer program for executing the above method.

According to an aspect of the present invention, there is provided a method of decoding a syntax element, the method comprising reading a plurality of candidate context models which correspond to a syntax element to be decoded; determining a context index increment for the syntax element; selecting one of the plurality of candidate context models according to the context index increment; and performing binary arithmetic decoding for the syntax element based on the selected context model.

According to another aspect of the present invention, there is provided a device for decoding a syntax element, the device comprising a context model reservoir which reads and stores a plurality of candidate context models corresponding to a syntax element to be decoded; an increment determining unit which determines a context index increment for the syntax element; a context model selection unit which selects one of the candidate context models by using the context index increment; and a decoding unit which performs a binary arithmetic decoding operation for the syntax element based on the selected context model.

BRIEF DESCRIPTION OF THE DRAWINGS

The above and other aspects of the present invention will become more apparent by describing in detail exemplary embodiments thereof with reference to the attached drawings in which:

FIG. 9 is a table comparing the performance of CABAC decoders with and without using the parallel processing according to an exemplary embodiment of the present invention.

DETAILED DESCRIPTION OF EXEMPLARY EMBODIMENTS OF THE PRESENT INVENTION

A method of decoding a syntax element will now be described in detail by explaining exemplary embodiments of the invention with reference to the attached drawings.

Figure 1:
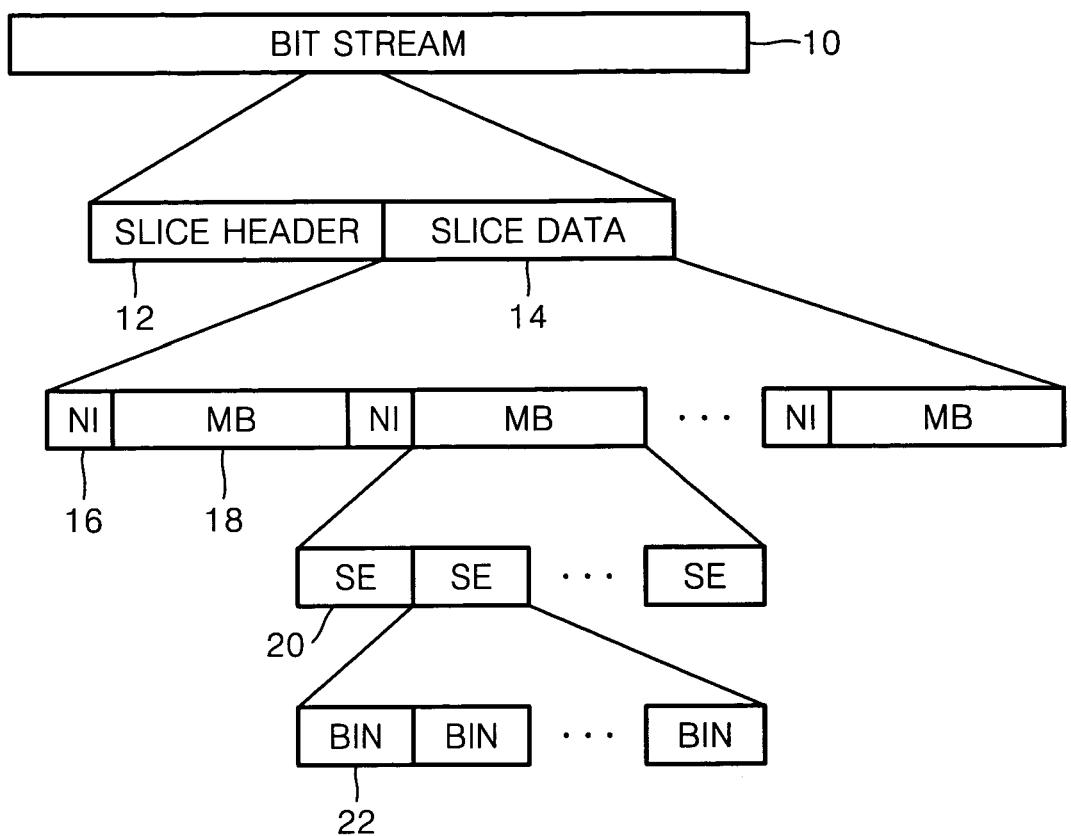
FIG. 1 shows a hierarchical structure of related art H.264/AVC decoding.

FIG. 1 shows a hierarchical structure of related art H.264/AVC decoding.

Referring to FIG. 1, a bit stream 10 according to the H.264/AVC standard consists of a set of syntax elements (SE) 20, similar to that of other moving picture compression standards.

The bit stream 10 includes one or more slices. The slices each consist of a slice header 12 and slice data 14.

The slice data 14 includes one or more macro blocks (MB) 18. The MB 18 includes a neighbor identifier (NI) 16 which borders neighboring MBs. Data of the neighboring MBs are used when a context selection is performed for the SEs 20 in the current MB 18.

The MB 18 includes one or more SEs 20. The SE 20 consists of a bin string including a plurality of bins 22.

Figure 2:
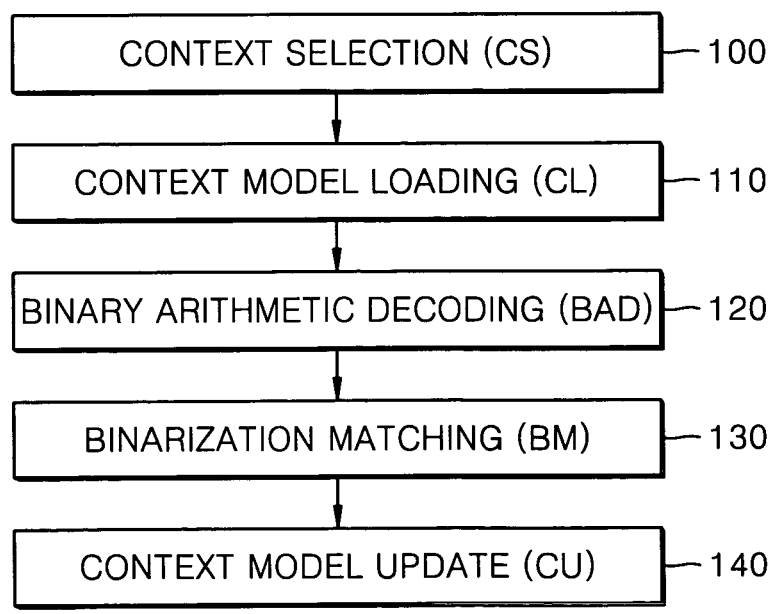
FIG. 2 shows unit operations for decoding one bin.

FIG. 2 shows unit operations for decoding one of the plurality of bins 22. Referring to FIG. 2, the unit operations of context selection (CS) (operation 100), context model loading (CL) (operation 110), binary arithmetic decoding (BAD)

(operation 120), binarization matching (BM) (operation 130), and context model update (CU) (operation 140) are performed to decode each bin.

In general, the compression efficiency of H.264/AVC depends on the CABAC. Thus, to obtain better compression efficiency, the CABAC decoding has to be performed more effectively. The CABAC decoding is the process of sequentially decoding a plurality of binary values (0 or 1), or "bins". To decode each bin, several unit operations are sequentially performed. Due to the algorithms of the operations, it is difficult to perform the unit operations in parallel processing. Thus it is difficult to reduce the decoding time for each bin, that is, the latency.

The value of the SE is converted into a variable length code (VLC) through binarization. A bin string including one or more bins is obtained when variable length coding is performed. The bin string is encoded using CABAC. Thus, when the SE is decoded using CABAC, the bin string is obtained as a result. Each bin has a value of 0 or 1. The bin value which has a higher probability of occurrence in all of the SEs is referred to as the most probable symbol (MPS), and the probability of occurrence of the MPS is referred to as the symbol probability. The symbol probability may be any value in the range of 0 to 1. However, the symbol probability is represented finitely through quantization, since the CABAC decoder cannot provide infinite precision. Therefore, the symbol probability is represented by a 6-bit probability state index.

Bins of each SE have different statistical features, such as the probability state index and the MPS. The statistical feature of the bins is referred to as a context. Each SE has one or more contexts, and each context has a probability state index and an MPS. By combining the six-bit probability state index with the one-bit MPS of each context, a seven-bit context model is obtained. There are as many as 399 context models in the H.264/AVC main profile.

To decode each bin 22 corresponding to the SE 20, the decoder must know the context corresponding to the bins 22. The CS operation 100 is the process of selecting the context corresponding to the bins 22. In general, the first bin of the SE 20 corresponds to one context among a maximum of four contexts. The context is indexed by a context index ctxIdx. The context index ctxIdx is represented by the sum of a context index offset ctxIdxOffset and a context index increment ctxIdxInc. The context index offset ctxIdxOffset is inherently defined according to the type of SE 20. The context index increment ctxIdxInc is obtained in the CS operation 100.

When the context index increment ctxIdxInc obtained in the CS operation 100 is added to the context index offset ctxIdxOffset, the context index ctxIdx is obtained. The context index ctxIdx is converted into an address of a context model, and the context model required to decode the current bin is read from a memory using the address. This is referred to as the CL operation 110.

The BAD operation 120 is performed using the context model read as above. A bin value is determined in the BAD operation 120. Further, in the BAD operation 120, the current context model value may be modified according to the determined bin value.

In the BM operation 130, a decision is made as to whether a new bin string, which is generated by combining the determined bin value with the current bin string, constitutes a valid bin string.

In the CU operation 140, if the context model value is modified in the BAD 120 operation, the modified value is stored in a memory.

In this exemplary embodiment of the present invention, the following conditions have to be satisfied.

1. The average number of bins included in each SE 20 is less than 1.5. Thus, it is sufficient to decode the first bin to obtain most of the SEs 20.

2. A maximum of four context models correspond to the first bin of most of the SEs.

3. The context model is represented by 7 bits. Thus, if the memory width is 32 bits, four context models can be stored in one word of the memory.

4. A context model corresponding to one SE does not overlap a context model corresponding to another SE.

According to condition 1, most SEs consist of one bin, which shows that the decoding time for the first bin has to be reduced in order to improve the overall decoding process.

An exemplary embodiment of the present invention provides a method of performing the CS operation 100 and the CL operation 110 through parallel processing. A context index ctxIdx is the sum of the context index offset ctxIdxOffset and the context index increment ctxIdxInc. Context models are sequentially stored in the memory according to the type of each SE.

According to condition 2, one of the maximum of four context models is selected for the first bin. Thus, starting from a memory address corresponding to the context index offset ctxIdxOffset, the maximum of four context models corresponding to one SE are sequentially stored in the memory.

To perform the CS operation 100 and the CL operation 110 in one cycle, the context models corresponding to one SE are concurrently read by using the context index offset ctxIdxOffset. The context models concurrently read from the memory are referred to as candidate context models.

The context index increment ctxIdxInc for the SE is calculated while the candidate context models are read from the memory. Then, a context model corresponding to the context index increment ctxIdxInc is selected among the candidate context models.

A maximum of four candidate context models are read from the memory in one cycle. According to condition 3, four candidate context models can be read at the same time. Therefore, to perform the CL operation and the CS operation at the same time, four candidate context models have to be read from the memory at the same time. For this, the candidate context models corresponding to one SE are aligned in a unit of a word.

To read the candidate context models corresponding to one SE at the same time, the candidate context models corresponding to one SE must not overlap with candidate context models corresponding to another SE, which is satisfied as described in condition 4.

The H.264/AVC main profile has about 400 context models. Thus, if one byte is assigned for each context model, the memory capacity needed is about 400 bytes. However, the number of candidate context models corresponding to one SE is not always a multiple of 4. For this reason, when the candidate context models corresponding to one SE are aligned in the unit of a word, the memory capacity has to be increased by about 15% to 460 bytes. Thus, the size of the on-chip memory has to be increased by about 60 bytes. However, given the total size of the circuit used in exemplary embodiments of the present invention, this does not affect the size, speed, and power consumption.

Figure 3:
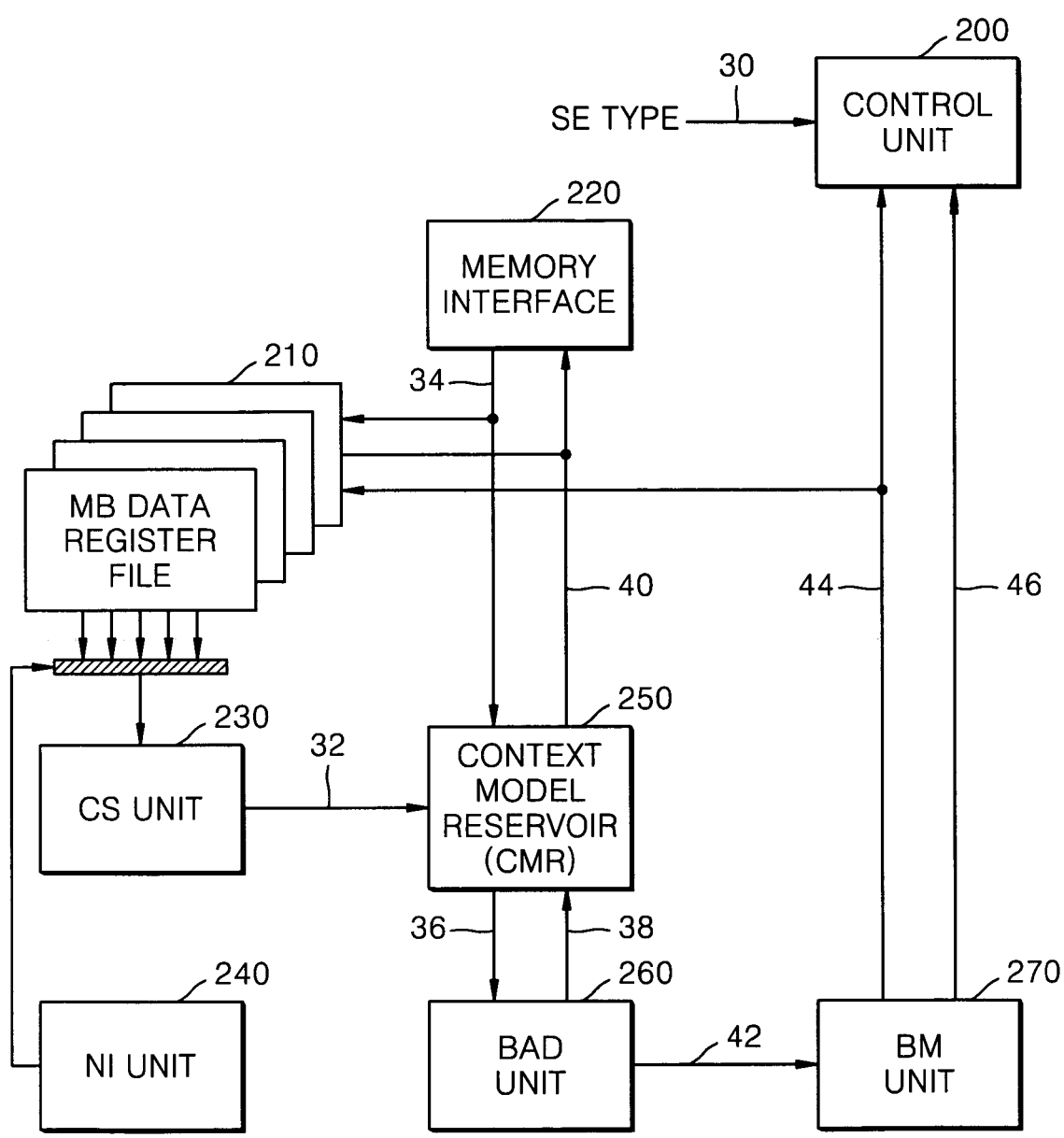
FIG. 3 is a block diagram of a decoding device for decoding a syntax element, according to an exemplary embodiment of the present invention.

FIG. 3 is a block diagram of a decoding device for decoding a syntax element, according to an exemplary embodiment of the present invention. Referring to FIG. 3, the decoding device includes a control unit 200, a macro block (MB) data register file 210, a memory interface 220, a context selection (CS) unit 230, a neighbor identification (NI) unit 240, a context model reservoir (CMR) 250, a binary arithmetic decoding (BAD) unit 260, and a binarization matching (BM) unit 270.

The control unit 200 controls the operation of each unit according to the type (SE Type) 30 of each SE externally input to the control unit 200

The MB data register file 210 stores data of the current MB and data of MBs neighboring the current MB, that is, from previously processed MBs. This is because the data of the neighboring MBs have to be referred to in some cases in the CS operation. The MB data is updated through the memory interface 220.

The CS unit 230 performs the CS operation by referring to the data stored in the MB data register file 210.

The NI unit 240 selects an MB which is referred to by the CS unit 230.

The CMR 250 reads and stores candidate context models.

The BAD unit 260 performs the BAD operation by using a context model 26 selected by the CS unit 230 from among the candidate context models stored in the CMR 250, to generate a 1-bit binary value, that is, a bin value 42.

The BAD unit 270 uses the bin value 42 to perform the BM operation. According to the result of the BM operation, if it is determined that the current bin string is valid, a valid signal 46 has the value of 1. When the valid signal 46 is 1, after receiving the valid signal 46, the control unit 200 controls other units to decode the next SE.

Further, the BAD unit 270 generates a value 44 of the decoded SE to be transferred to the MB data register file 210.

Figure 4A:
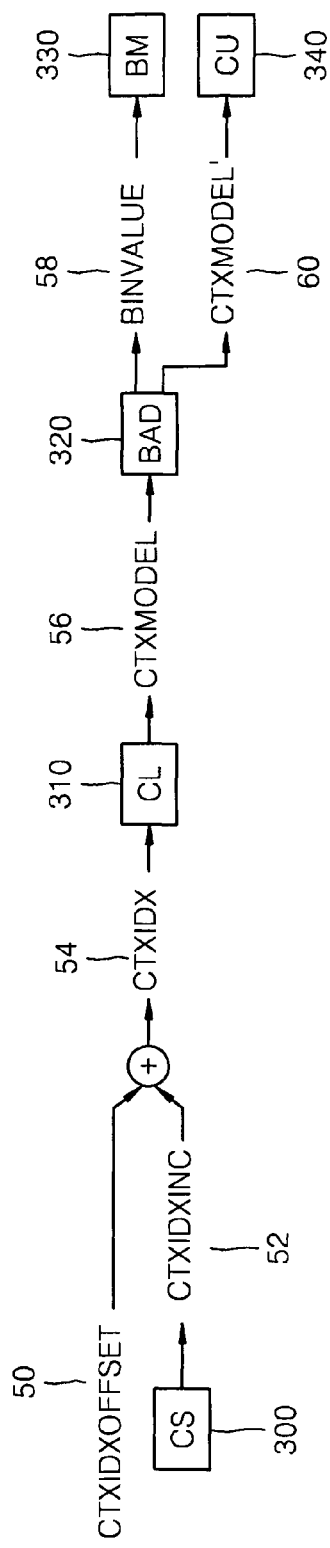
FIGS. 4A and 4B show unit operations in CABAC decoding with respect to time, along with a data dependency.
Figure 4B:
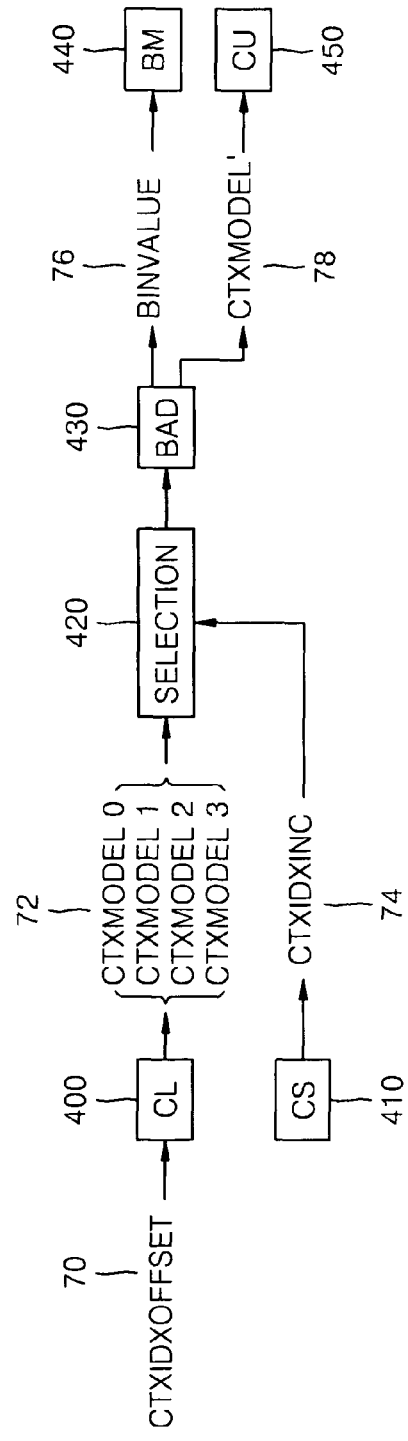

FIGS. 4A and 4B show unit operations in CABAC decoding with respect to time, along with a data dependency.

FIG. 4A shows the case of not using parallel processing.

A context index offset (CTXIDXOFFSET) 50 is inherently defined according to the type of the SE. After a context index increment (CTXIDXINC) 52 is generated as a result of a CS operation 300, the CTXIDXOFFSET 50 and the CTXIDX-INC 52 are added to generate a context index (CTXIDX) 54.

In a CL operation 310, a context model (CTXMODEL) 56 is read by using the CTXIDX 54. The CTXMODEL 56 is used as an input in a BAD operation 320.

In the BAD operation 320, a bin value (BINVALUE) 58 and a modified context model (CTXMODEL') 60 are output. The BINVALUE 58 is used as an input in a BM operation 330, and the CTXMODEL' 60 is used as an input in a CU operation 340.

Since the BM operation 330 and the CU operation 340 do not have a data dependency, the two operations can be performed in the same cycle.

In the general CABAC decoding of FIG. 4A, the CS operation 300, the CL operation 310, and the BAD operation 320 each require one cycle, and the BM operation 330 and the CU operation 340 together require one cycle. Thus, a total of 4 cycles are required to decode one bin.

FIG. 4B shows the case of using parallel processing according to an exemplary embodiment of the present invention.

In a CL operation 400, candidate context models 72 corresponding to an SE are read at the same time by using a context index offset (CTXIDXOFFSET) 70. In the case shown in FIG. 4B, four candidate context models 72 correspond to the SE to be decoded.

At the same time (in the same cycle) as the CL operation 400 is performed, a CS operation 410 is performed to determine a context index increment (CTXIDXINC) 74. One of the candidate context models 72 is selected using the determined CTXIDXINC 74 (operation 420).

A BAD operation 430, a BM operation 440, and a CU operation 450 are the same as the BAD operation 320, the BM operation 330, and the CU operation 340 of FIG. 4A. Thus, descriptions thereof will be omitted.

In the CABAC decoding of FIG. 4B, the CL operation 400 and the CS operation 410 can be performed in the same cycle. To decode one bin, a total of three cycles are required, in which one cycle is for performing both the CL operation 400 and the CS operation 410, one cycle is for both selecting one of candidate context models 72 (operation 420) and performing the BAD operation 430, and one cycle is for both the BM operation 440 and the CU operation 450.

To use parallel processing in decoding according to exemplary embodiments of the present invention, it is advantageous to have candidate context models corresponding to the same SE arranged in the memory in the unit of a word. Variation of data arrangement in the context model memory will now be described with reference to FIGS. 5A and B.

Figure 5A:
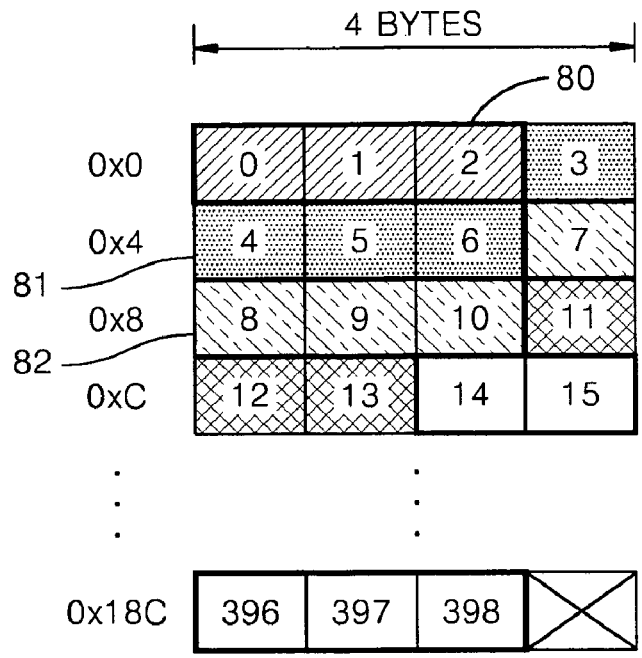
FIGS. 5A and 5B respectively show examples of a storage state of a context model in a case of not using parallel processing and in a case of using parallel processing according to an exemplary embodiment of the present invention.

FIG. 5A shows an example of a storage state of a context model in the general case of not using parallel processing. In practice, a context model is stored in the memory, but a context index CTXIDX is shown in FIG. 5A for convenience.

Three context models 80 corresponding to the first SE respectively have context indexes 0, 1, and 2 and are stored in memory addresses 0x0, 0x1, and 0x2. Four context models 81 corresponding to the second SE respectively have context indexes 3, 4, 5, and 6 and are stored in memory addresses 0x3, 0x4, 0x5, and 0x6. Four context models 82 corresponding to the third SE respectively have context indexes 7, 8, 9, and 10 and are stored in memory addresses 0x7, 0x8, 0x9, and 0xA.

Since the H.264/AVC main profile has about 400 context models, the memory capacity has to be about 400 bytes.

Figure 5B:
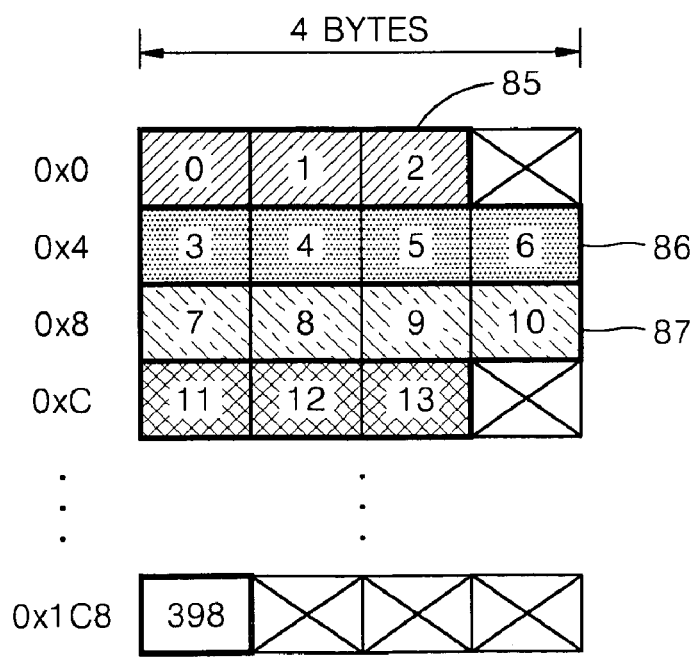

FIG. 5B shows an example of a storage state of a context model in the case of using parallel processing according to an exemplary embodiment of the present invention. As in the case of FIG. 5A, a context index CTXIDX is shown for convenience.

To use parallel processing according to an exemplary embodiment of the present invention, context models corresponding to one SE have to be read at the same time. However, if context models corresponding to one SE are laid across a word boundary, as they are in FIG. 5A, then two cycles are required to read the context models. Thus, a CL operation and an index increment determination cannot be performed in one cycle.

Therefore, in FIG. 5B, all of the context models corresponding to each SE are arranged in the unit of a word.

Since the three context models 85 corresponding to the first SE are the same as in the case of FIG. 5A, descriptions thereof will be omitted.

Four context models 86 corresponding to the second SE respectively have context indexes 3, 4, 5, and 6, which is the same as in FIG. 5A. However, the context models 86 are aligned with the word boundary, since they have to be read at the same time in the CL operation. Thus, the context models 86 are respectively stored in the memory addresses 0x4, 0x5, 0x6, and 0x7.

In addition, four context models 87 corresponding to the third SE are respectively stored in the memory address 0x8, 0x9, 0xA, and 0xB, and are therefore aligned with a memory boundary in the unit of a word.

As may be seen from FIG. 5B, some portions of the memory are not used (e.g., memory address 0x3). These portions occupy a total of about 60 bytes. Thus, about 460 bytes are needed for the memory, which requires about a 15% increase of memory capacity. However, given the total size of the circuit typically used to decode, an increase of about 60 bytes of the on-chip memory has a negligible affect on the size, speed, and power consumption of the decoder.

Figure 6:
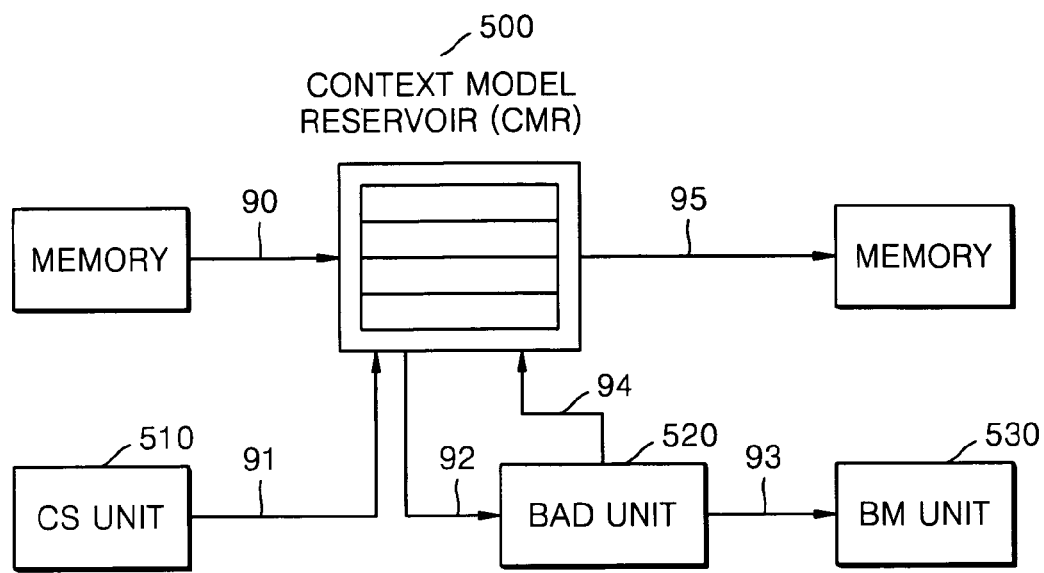
FIG. 6 is a block diagram of a decoding device for decoding a syntax element, according to an exemplary embodiment of the present invention.

FIG. 6 is a block diagram of a decoding device for decoding a syntax element, according to an exemplary embodiment of the present invention. The operation of a CMR 500 will now be described in detail with reference to FIG. 6. In FIG. 6, only elements necessary for explanation are shown among the elements of the decoding device of FIG. 3.

The CMR 500 reads a maximum of four candidate context models 90 from a memory. At the same time, a CS unit 510 determines a context index increment 91 of a syntax element. These two operations are performed in one cycle.

In the next cycle, one of the candidate context models 90 stored in the CMR 500 is selected by using the context index increment 91. A selected context model 92 is transferred to a BAD unit 520 to be used in binary arithmetic decoding of the syntax element.

While outputting a one-bit bin value (a bin value 93) as a result of the binary arithmetic decoding, the BAD unit 520 can modify and output a context model value. The modified context model 94 is not directly stored in the memory but is transferred to the CMR 500. The CMR 500 modifies the context of the stored candidate context model to the context of the modified context model 94. The CMR 500 stores and modifies the read candidate context models, and when the current candidate context models are no longer used because another syntax element is to be decoded, the CMR 500 stores the candidate context models 95 in the memory at once.

Figure 7:
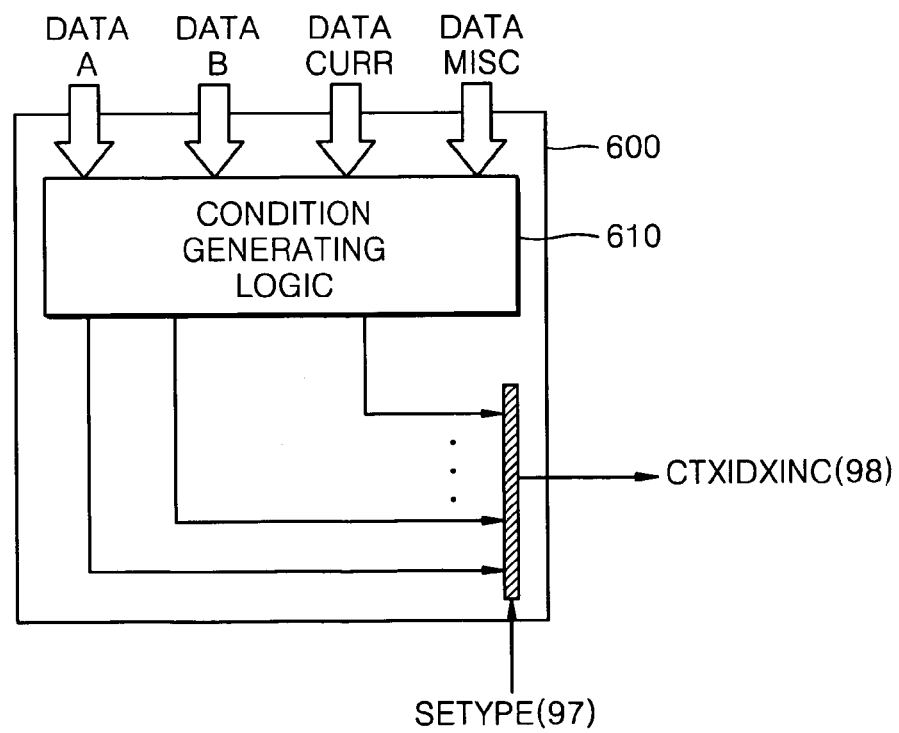
FIG. 7 is a block diagram of the internal structure of a context selection (CS) unit, according to an exemplary embodiment of the present invention.

FIG. 7 is a block diagram of the internal structure of a CS unit 600, according to an exemplary embodiment of the present invention. Referring to FIG. 7, input signals DATA A, DATA B, DATA CURR, and DATA MISC are input to the CS unit 600.

The input signal DATA CURR is data of the current MB. The input signal DATA A is data of an MB neighboring the current MB to the left. The input signal DATA B is data of an MB neighboring the current MB above. The input signal DATA MISC is data used for a context selection.

A condition generating logic 610 generates context index increments CTXIDXINC for each type of syntax element (SETYPE) 97 by using the input signals. A CS unit 600 selects a context index increment 98 corresponding to the current syntax element from among the generated context index increments CTXIDXINC.

Figure 8:
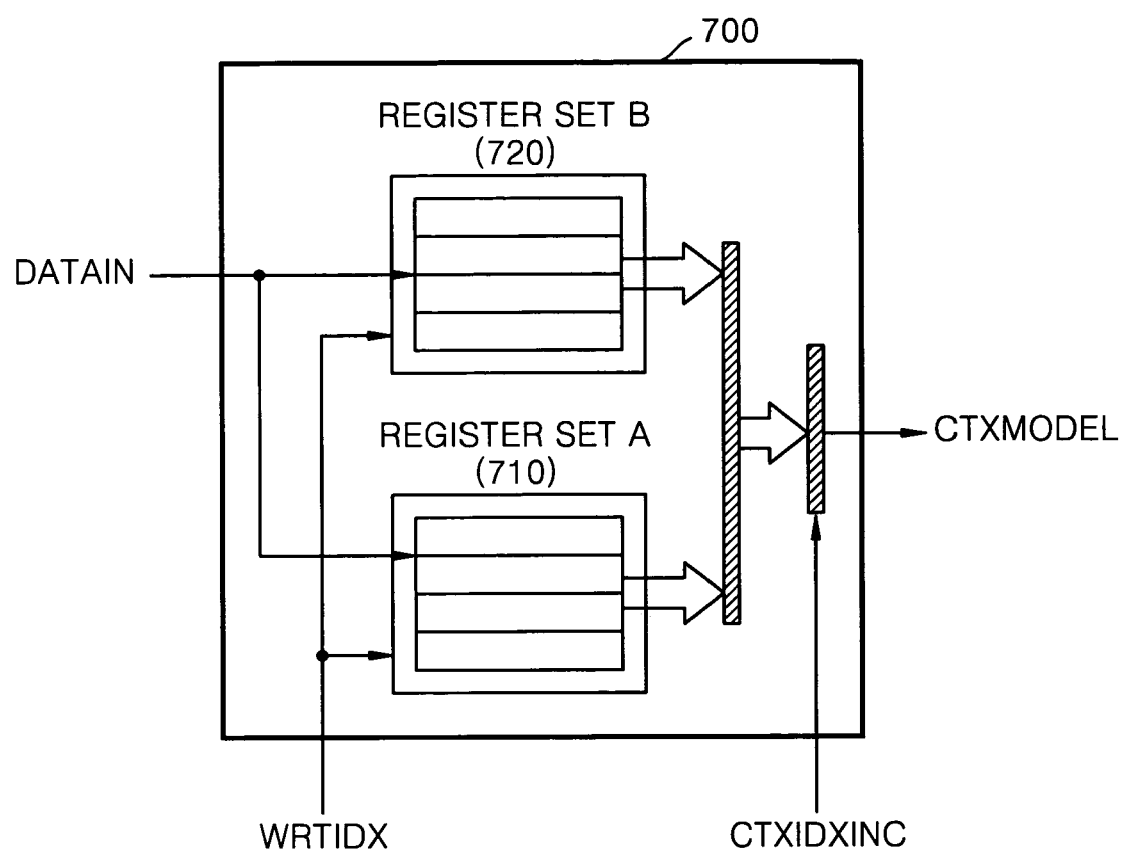
FIG. 8 is a block diagram of a context model reservoir (CMR) according to an exemplary embodiment of the present invention.

FIG. 8 is a block diagram of a CMR 700 according to an exemplary embodiment of the present invention. Referring to FIG. 8, the CMR 700 includes two register sets, REGISTER SET A 710 and REGISTER SET B 720. Only one of the two register sets is used to decode one syntax element. Each register set has enough capacity to store all candidate context models corresponding to one syntax element. By using the two identical register sets, the time delay between the CU operation and the CL operation can be minimized.

In the CL operation, an input signal DATAIN is the maximum of four candidate context models read from a memory, and in the CU operation, the input signal DATAIN is the modified context model output from the BAD unit 520.

An input signal WRTIDX selects a register set to store the input signal DATAIN. An input signal CTXIDXINC is a context index increment and selects one of the candidate context models.

FIG. 9 is a table comparing the performance of CABAC decoders with and without using the parallel processing according to an exemplary embodiment of the present invention. Referring to the table of FIG. 9, the column labeled "SEQUENTIALLY" shows the number of cycles when not using parallel processing, and the column labeled "IN PARALLEL" shows the number of cycles when using parallel processing.

Referring to FIG. 9, in the first example (SALESMAN) of processing 81 frames, the number of cycles is reduced by 17.6% through parallel processing according to an exemplary embodiment of the present invention. In the second example (FOREMAN) and the third example (SILENT), the number of cycles is reduced by 16.1% and 17.4%, respectively.

Therefore, the method and device for decoding a syntax element according to exemplary embodiments of the present invention uses fewer cycles for decoding, thereby reducing the decoding time.

According to a method and device for decoding a syntax element according to exemplary embodiments of the present invention, while a plurality of candidate context models are read from a memory, a context index increment for a syntax element can be determined. Thus, a context selection operation and a context model loading operation can be performed through parallel processing, thereby reducing the decoding time.

The present inventive concept can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to certain exemplary embodiments thereof, it will be understood by those skilled in the art that various changes in form and detail may be made therein without departing from the spirit and scope of the invention as defined by the appended claims. The exemplary embodiments should be considered in a descriptive sense only, and not for purposes of limitation. Therefore, the scope of the invention is defined not by the detailed description of the invention but by the appended claims, and all differences in scope will be construed as being included in the present invention.

What is claimed is:

1. A method of decoding a syntax element, the method comprising:
   reading, by a device for decoding a syntax element, a plurality of candidate context models which correspond to one syntax element to be decoded, according to the one syntax element to be decoded;
   determining, by the device, a context index increment for the one syntax element;
   selecting, by the device, a candidate context model of the read plurality of candidate context models according to the context index increment; and
   performing, by the device, binary arithmetic decoding for the one syntax element based on the selected candidate context model.

2. The method of claim 1, wherein the reading the plurality of candidate context models and the determining the context index increment are performed at the same time.

3. The method of claim 1, wherein the reading the plurality of candidate context models comprises reading the candidate context models by using a context index offset which is determined according to a type of the one syntax element.

4. The method of claim 1, wherein the plurality of candidate context models are arranged in a memory in a unit of a word.

5. The method of claim 1, further comprising:
performing binarization matching using a one-bit bin value generated in the binary arithmetic decoding operation; and
modifying the selected candidate context model based on a context model generated by the performing the binary arithmetic decoding.

6. The method of claim 5, wherein the performing the binarization matching and the modifying the selected candidate context model are performed at the same time.

7. The method of claim 1, wherein a maximum number of the plurality of candidate context models for the one syntax element is four.

8. A device for decoding a syntax element, the device comprising:
a context model reservoir which reads and stores a plurality of candidate context models corresponding to one syntax element to be decoded, according to the one syntax element to be decoded;
an increment determining unit which determines a context index increment for the one syntax element;
a context model selection unit which selects a candidate context model of the read candidate context models by using the context index increment; and
a decoding unit which performs a binary arithmetic decoding operation for the one syntax element based on the selected candidate context model.

9. The device of claim 8, wherein the context model reservoir reads and stores the plurality of candidate context models and the increment determining unit determines the context index increment at the same time.

10. The device of claim 8, wherein the context model reservoir comprises:
an offset determining unit which determines a context index offset according to a type of the one syntax element; and
a context model loading unit which reads the plurality of candidate context models by using the context index offset.

11. The device of claim 8, wherein the plurality of candidate context models are arranged in a memory in a unit of a word.

12. The device of claim 8, further comprising
a binarization matching unit which performs binarization matching using a one-bit bin value generated in the binary arithmetic decoding.

13. The device of claim 8, wherein the context model reservoir comprises:
a context model modifying unit which modifies a context of the stored plurality of candidate context models by using a context model generated in the binary arithmetic decoding operation; and
a context model storing unit which stores the plurality of candidate context models in a memory after the one syntax element is decoded.

14. The device of claim 8, wherein a maximum number of the plurality of candidate context models for the one syntax element is four.

15. The device of claim 8, wherein the context memory reservoir comprises a plurality of register sets, and each register set has a capacity to store all of the plurality of candidate context models corresponding to the one syntax element.

16. The device of claim 15, wherein one of the plurality of register sets is used to decode the syntax element.

17. A non-transitory computer-readable medium having embodied thereon a computer program for executing a method comprising:
reading a plurality of candidate context models which correspond to one syntax element to be decoded, according to the one syntax element to be decoded;
determining a context index increment for the one syntax element;
selecting a candidate context model of the read plurality of candidate context models according to the context index increment; and
performing binary arithmetic decoding for the one syntax element based on the selected candidate context model.

18. The non-transitory computer readable medium of claim 17, wherein the reading the plurality of candidate context models and the determining the context index increment are performed at the same time.

* * * * *